United States Patent [19]

Manners

[11] 4,188,568
[45] Feb. 12, 1980

[54] POWER SAVING CIRCUIT
[75] Inventor: David E. Manners, Alexander, N.Y.
[73] Assignee: GTE Sylvania Incorporated, Stamford, Conn.
[21] Appl. No.: 933,220
[22] Filed: Aug. 14, 1978
[51] Int. Cl.² .................................... H01J 31/00
[52] U.S. Cl. ............................. 315/411; 358/190
[58] Field of Search ........................ 315/411; 358/190

[56] References Cited
U.S. PATENT DOCUMENTS

| | | | |
|---|---|---|---|
| 3,621,134 | 11/1971 | Waring | 358/190 |
| 3,814,851 | 6/1974 | Nakagawa et al. | 358/190 |
| 3,947,632 | 3/1976 | Giger et al. | 358/190 |
| 4,112,465 | 9/1978 | Willis | 358/190 |
| 4,127,875 | 11/1978 | Fernsler et al. | 358/190 |

Primary Examiner—Malcolm F. Hubler
Attorney, Agent, or Firm—John A. Odozynski

[57] ABSTRACT

A circuit for selectively supplying current to the horizontal oscillator from one of two voltage sources. The first voltage source is primarily used to supply current to the horizontal output stage and supplies the oscillator only during startup of the horizontal deflection system. The second source is derived from a winding on the flyback transformer and supplies current to the oscillator after the startup period, that is, after its voltage or another or other voltages developed by sources derived from flyback windings have reached values sufficient to assure sustained operation of the horizontal deflection system. A startup detector responsive to a flyback-derived voltage determines which of the two voltage sources provides current at the output of the starting network, that is, at the power supply terminal of the horizontal oscillator.

12 Claims, 2 Drawing Figures

POWER SAVING CIRCUIT

CROSS-REFERENCE TO A RELATED APPLICATION

Cross reference is made to the related application entitled "Dual-Mode Horizontal Output Stage", by the same inventor as this application, David E. Manners, filed on the same date and assigned to the same assignee as this application.

FIELD OF THE INVENTION

This invention relates to horizontal deflection systems and more particularly to a power-saving supply scheme for the horizontal oscillator.

BACKGROUND OF THE INVENTION

Because of its attendant size, weight and cost, it has been occasionally found preferable to circumvent the use of an input line-isolation transformer in the design of television receivers. In such receivers, commonly referred to as "hot-chassis" receivers, the necessary voltage supplies are then directly derived from the AC line and returned to an AC or "Hot" ground. Typically, the AC line voltage is rectified and filtered to produce an unregulated output voltage of an amplitude necessarily dependent on the peak AC line voltage. In the receiver to be described below, this unregulated voltage is approximately 165 volts. The unregulated voltage may then be regulated or otherwise tailored to provide the necessary voltages for various portions of the receiver's circuitry. For example, as described below, the unregulated 165 volts is regulated to provide the 112-volt Horizontal B+ required by the horizontal output stage. Other parts of the receiver, for example, the tuner, video, sound and horizontal and vertical oscillator circuitry may require voltages in the range of 10 to 30 volts. In a conventional design the Horizontal B+ may be dropped simply through a dropping resistor or a series-pass transistor in order to develop the desired voltages. However, it is obvious to those skilled in the art that the voltage dropped, and hence power dissipated, across the resistor or series-pass transistor represents wasted energy to the extent that it serves no useful purpose in the operation of the receiver. In addition to wasting energy, this power dissipation results in the generation of sufficient heat in the receiver cabinet to cause thermal stress to other components as well as possible premature failure.

The subject invention represents a novel concept for supplying the lower voltages required by the receiver's circuitry while conserving energy to substantially the maximum extent possible. The essence of the concept is to provide additional secondary windings on the flyback transformer so as to develop these voltages. The alternating current developed by the horizontal output transistor in the flyback primary induces voltages in these secondary windings that can be rectified and filtered to effect the desired voltages.

Obviously, in order for the circuitry that is powered from the flyback secondary windings to be operational, there must be a signal developed in the flyback primary; that is, the horizontal oscillator must be operating. Consequently, the power supply for the oscillator cannot be solely dependent on the voltage induced in a flyback secondary winding. As before, the Horizontal B+ can be conveniently used to power the oscillator. However, since the Horizontal B+ is typically on the order of 100 V. and the voltage required by the oscillator may be approximately 20 V., the Horizontal B+ must be dropped through, for example, a dropping resistor or series-pass transistor. In so doing a significant amount of power will necessarily be dissipated across the resistor or transistor. A considerably more desirable configuration would allow the oscillator also to be powered from a flyback secondary winding of an appropriate voltage.

OBJECTS OF THE INVENTION

It is a primary object of this invention to power the horizontal oscillator from a supply other than the supply used by the horizontal output stage, preferably from a supply derived from a secondary winding on the flyback transformer.

It is a further object of this invention that the oscillator supply be operational upon startup of the receiver, thereby assuring startup of the horizontal deflection system.

It is a further object of this invention to provide a power-efficient supply scheme for the horizontal oscillator.

To this end, it is an object of this invention to supply current to the oscillator from the horizontal output stage supply during startup and from the flyback-derived supply thereafter.

SUMMARY OF THE INVENTION

The above and other objects and advantages are achieved in one aspect of this invention by a power supply system for a horizontal oscillator. The system comprises a first voltage source for supplying power to at least the horizontal output stage and at least one voltage supply derived from a winding on the flyback transformer. A steering network has inputs coupled to the first voltage source and to the derivative voltage source and an output coupled to the horizontal oscillator power supply terminal. During a first period of time the oscillator supply current is provided by the first voltage source; during a second period of time the oscillator supply current is provided by a derivative voltage source.

DETAILED DESCRIPTION OF THE PREFERRED EMBODIMENTS

For a better understanding of the present invention, together with other and further objects, advantages and capabilities thereof, reference is made to the following disclosure and appended claims in connection with the above description of some of the aspects of the invention.

Figure 1:
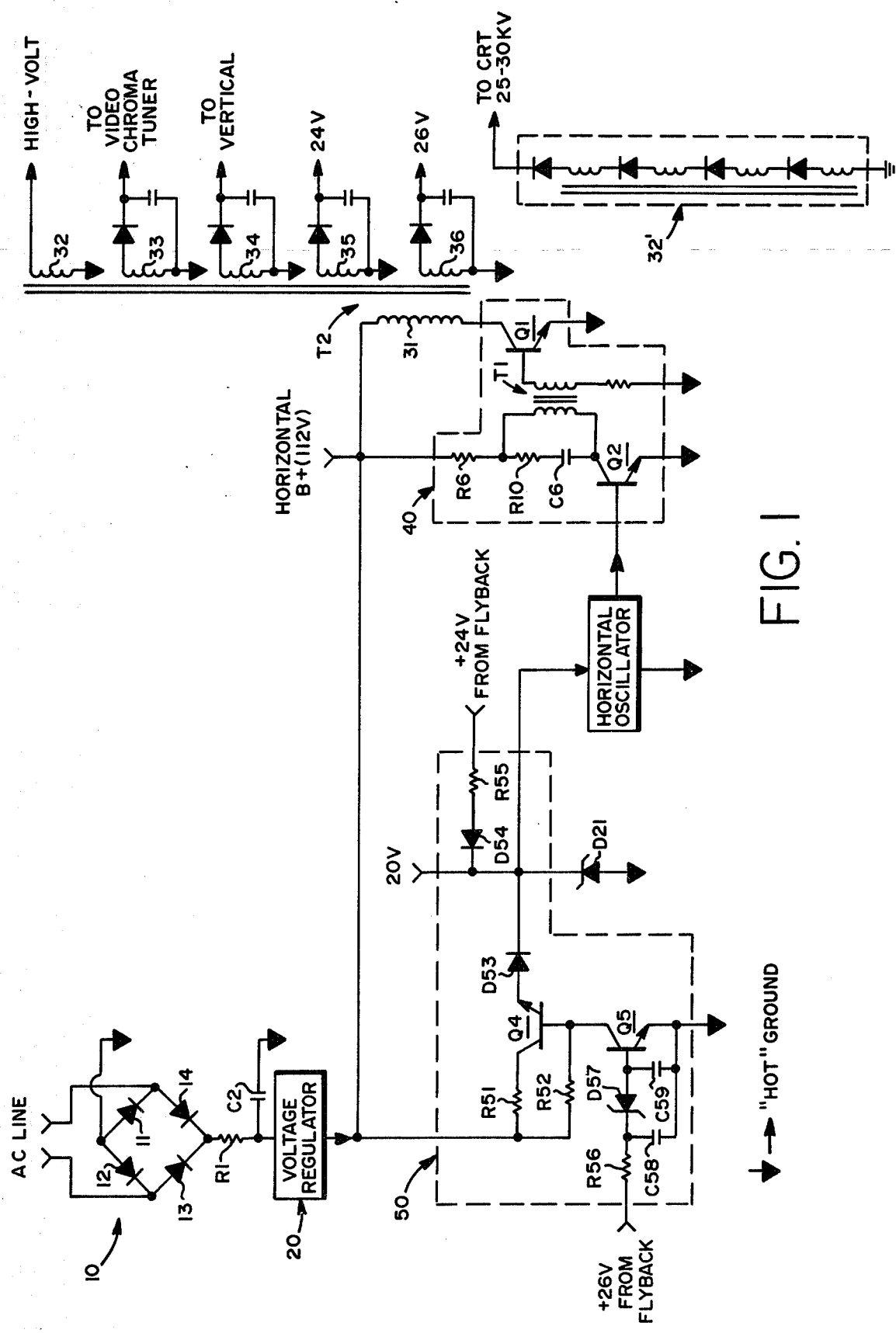
FIG. 1 is a schematic diagram of the subject invention.

Referring now to FIG. 1, an input voltage is developed by a voltage source including an input voltage supply 10 and a voltage regulator 20. An unregulated voltage is derived from the AC line by a rectifier comprising diodes 11, 12, 13 and 14 and an RC filter circuit comprising a resistor R1 and a capacitor C1. Although a full-wave, bridge-type rectifier is shown in FIG. 1, other types of rectifiers may be used depending on the receiver's requirements. The input current to the rectifier is drawn from and returned to the AC line, thereby effecting an AC or a "Hot" ground return. Similarly, the RC filter is connected between the output of the rectifier and ground.

Voltage supply 10 supplies a nominal unregulated voltage of approximately 165 volts to a voltage regulator 20. A regulated voltage, hereinafter referred to as Horizontal B+, appears at the output of regulator 20.

This voltage comprises the requisite power supply for the horizontal deflection circuit 40. The 112 volts is coupled through a dropping resistor R6 to the series combination of resistor R10 and capacitor C6 and through R10 and C6 to the collector of the horizontal drive transistor Q2. Q2 develops an alternating current in the primary winding of the horizontal driver transformer T1. The primary of T1 is connected between the collector of Q2 and the junction of R6 and R10. A secondary winding of T1 is connected to the horizontal output transistor Q3 and coupled through a resistor to ground. The collector of Q3 is coupled through a primary winding 31 of the flyback transformer T2 to the Horizontal B+.

In conventional television receivers the horizontal deflection circuit serves at least the dual purposes of driving both the horizontal deflection yoke (not shown) as well as the flyback transformer. During the latter portion of the trace period of the horizontal cycle the horizontal output transistor Q3 is conducting, thereby providing current for both the deflection yoke and the primary of the flyback transformer. During retrace Q3 is abruptly cut off, initiating retrace and resulting in an AC voltage of approximately 920 volts peak across the primary winding 31. This voltage is magnetically coupled to winding 32, producing a peak voltage of approximately 8 to 10 K volts across that winding. This voltage is then rectified and multiplied, that is, tripled by a tripler circuit (not shown), to provide the 25 or 30 Kilovolts required to operate the receiver's cathode ray tube.

Although a more or less conventional flyback transformer is depicted in FIG. 1, and its operation described above, it has been found advantageous to utilize a novel "integrated flyback" which incorporates the flyback and tripler circuitry in one unit. The integrated flyback comprises four windings, each separated by a diode. The 25 to 30 K High-voltage (the CRT anode voltage) is a direct output of the integrated flyback, thereby obviating the need for a discrete tripler circuit. A particular embodiment of an integrated flyback is shown as element 32' on FIG. 1.

In addition to deriving the high voltage supply from the flyback transformer, it has been found convenient to provide additional windings on the flyback transformer in order to accommodate the voltage supply requirements of other portions of the receiver's circuitry. In particular, winding 33 is used to develop a voltage supply for the receiver's video, chrominance and tuner circuits; winding 34 is used to develop a supply for the vertical deflection circuitry. Typically the waveforms across these windings are rectified and filtered, by respective diodes and capacitors as shown, to provide the desired supply voltages. A specific advantage of this configuration is that, these windings can be tailored to develop the appropriate voltages for the associated circuitry thereby conserving energy to substantially the maximum extent possible. However, as recited above, the operation of the horizontal oscillator is a prerequisite to the development of the isolated supply voltages derived from windings 33 and 34 of the flyback transformer; therefore, it is not possible to simply include another winding on the flyback transformer for the purposes of supplying a voltage to the horizontal oscillator. In addition, because of the power wasted, simply dropping the 112-volt Horizontal B+ to the voltage (20 volts) required by the oscillator, is a less than ideal situation.

Alternatively, a supply voltage for the horizontal oscillator is developed by including the customary input power transformer coupled to the AC line. However, it seems incongruous to provide an input isolation transformer for the horizontal oscillator when the primary purpose of a hot-chassis receiver is to avoid such a transformer. The startup circuit 50 of the subject invention presently to be described, represents a considerably more desirable configuration.

The startup supply includes resistor R51 and R52 connected between the Horizontal B+ and the collector and base electrodes, respectively, of a series-pass semiconductor device, transistor Q4. Q4 has an emitter electrode coupled through a diode D53 to the cathode of a zener diode D21. D21 serves to establish a regulated 20-volt supply for the horizontal oscillator. The cathode of D21 is also coupled through a series-connected diode D54 and resistor R55 to a 24-volt source derived from the flyback secondary winding. In a manner that will become apparent, diodes D53 and D54 form a steering network that determines which voltage source will supply current to the horizontal oscillator at its 20-volt power supply terminal. That is to say, the source of the current appearing at the steering network output, the junction of the cathodes of D53 and D54, depends on the relative voltages at network's inputs, the anodes of D53 and D54. The base of Q4 is also connected to the collector of transistor Q5 which has an emitter connected to the Hot ground. The base of Q5 is coupled through a series-connected resistor R56 and zener diode D57 to a 26-volt source, also derived from a secondary winding on the flyback transformer. The base of Q5 and the junction of R56 and D57 are respectively coupled by capacitors C58 and C59 to the Hot ground.

As indicated above, the function of the startup circuit 50 is to provide a voltage supply for the horizontal oscillator without significant degradation of the receiver's power consumption efficiency. This is accomplished by switching the oscillator supply from the Horizontal B+ during startup and to the +24-volt supply during steady-state operation, that is, when the voltages derived from the flyback secondary windings have reached values sufficient to assure sustained operation of the horizontal oscillator and hence of the entire deflection system.

Immediately subsequent to the energization of the receiver R52 will provide sufficient base current to drive Q4 into saturation. Because the 24-volt source will not have yet reached its steady-state value, the voltage on the anode of D53 will be greater than the voltage on the anode of D54 and Q4 will provide current through D53 to both D21 and the horizontal oscillator. Dropping resistor R51 lowers the collector voltage of, and hence the power dissipated by, Q4. Assuming a total Q4 emitter current of about 110 ma, corresponding to R51=820 ohms, approximately ten watts will be dissipated across R51, Q4 and D53 during the startup period.

After some interval of time, both the 24-volt and 26-volt derivative supplies will approach their nominal values. The 26-volt supply will reach a value sufficient to activate the startup detector comprising resistor R56, zener diode D57, and transistor Q5. This will happen when the voltage developed by the nominal 26-volt supply reaches a value greater than the breakdown voltage of D57. R56 and D57 will conduct current that will be the base drive to Q5 from the 26-volt supply. The current through R52 will be diverted from the base of Q4 to the collector of Q5. Q5 will approach saturation and the voltage at the base of Q4 will approach ground potential. The voltage at the anode of D54 will be greater than that at the anode of D53 and both Q4 and D53 will be rendered nonconducting. The horizontal oscillator will now be powered from the 24-volt flyback supply. During steady-state operation only approximately 0.34 watts will be dissipated across D54 and R55.

At this point it should be noted that switching the horizontal oscillator supply from the Horizontal B+ to the 24-volt flyback derived source not only conserves input power but also considerably relaxes the wattage rating, and hence physical size and cost, of R51. For example, if the 20-volt oscillator supply were to be continuously drawn from the Horizontal B+, R51 would continuously dissipate approximately ten watts and would necessarily have a wattage rating at least equal to that. However, because in this invention R51 will conduct current only during a relatively brief startup period, lasting less than 0.5 second, a much smaller and less expensive 2-watt resistor can be safely used. In addition, although as shown in FIG. 1 and described above, two separate flyback-derived supplies are used with the power saving circuit 50, depending on the particular receiver voltage supply requirements, it will be possible to operate the circuit with only one flyback-derived supply. For instance, the 24-volt supply could be used to both power the horizontal oscillator as well as to provide an input to the startup detector.

Figure 2:
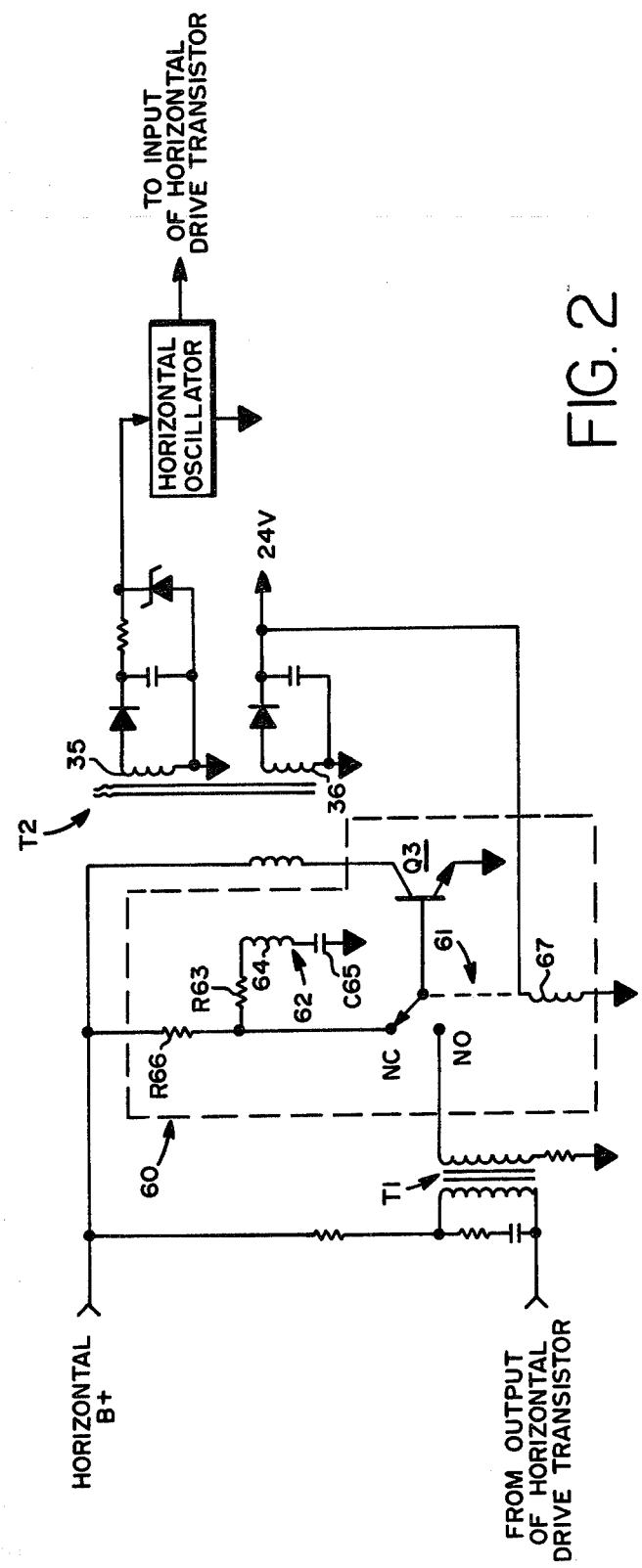
FIG. 2 is a schematic diagram of a dual-mode horizontal output stage that also allows the horizontal oscillator to be powered from a flyback-derived voltage source, conserves power, and assures startup of the horizontal deflection system.

Another materially different scheme for effecting startup of the horizontal deflection system is illustrated in FIG. 2. As shown there the horizontal output stage 60, enclosed in dashed lines, comprises switching device 61 in the form of a SPDT relay with a common terminal, or pole, connected to the base electrode of an output device, transistor Q3. Q3 has an emitter electrode returned to the Hot ground. The normally open (NO) terminal of the relay is connected to the secondary of the horizontal interstage transformer T1. The normally closed (NC) terminal is coupled to the Hot ground through a feedback network comprising the series-connected resistance, resistor R63, inductance, winding 64, and capacitance, capacitor C65. The NC terminal is also coupled through bias means, in the form of resistor R66, to the Horizontal B+. The control winding 67 of relay 61 is coupled between the Hot ground and the 24-volt supply.

Immediately subsequent of the energization of the receiver the relay will be in its NC position. This is because, as before, the voltages derived from the flyback secondary windings, including the 24-volt supply, will not have reached their nominal values and the 24-volt supply will not be able to activate the relay. Base current will be provided for Q3 by R66. As shown in FIG. 2, the output of Q3 of stage 60, at the collector electrode, is coupled from the primary winding 31 of the flyback transformer to the winding 64. Winding 64 may consist of 10 turns of wire wound on the flyback core. As a result network 62 will provide the necessary amount of feedback from the collector output of Q3 to its input, that is, base, so that is operates in an oscillatory mode. With a winding 64 constructed as described and values for C65 and R63 equal to 0.18 microfarad and 39 ohms respectively, Q3 will oscillate at a frequency equal to approximately 22 KHz. The alternating current in the primary winding of 71 will induce voltages in both windings 35 and 36. At a time when the voltages provided by the 26- and 24- volt supplies have reached levels such that sustained operation of the horizontal oscillator is assured, the voltage across winding 67 will be sufficient to activate relay 61, thereby connecting its NC terminal to the common terminal and in so doing connecting the base of Q3 to the secondary of T1. The horizontal output stage will then operate in the steady-state, switching mode in response to the signal developed by the horizontal oscillator.

It should be noted that although switching device 61 has been illustrated as an electromechanical device, a relay, it is obvious to those skilled in the art that it may take on many other forms, including various known semiconductor switching configurations without departing from the scope of the subject invention.

Accordingly, there has been shown and described what are at present considered the preferred embodiments of the invention, it will be obvious to those skilled in the art that various changes and modifications may be made therein without departing from the scope of the invention as defined by the appended claims.

What is claimed is:

1. In a television receiver having a first voltage source, Horizontal B+, for powering the horizontal output stage and voltage dropping circuit for dropping the value of the Horizontal B+ to a value required to accommodate the horizontal oscillator, a power-saving improvement comprising:
   a steering network having one input coupled to the dropping circuit, another input coupled to one of one or more derivative voltage sources derived from a flyback transformer secondary winding and an output coupled to the horizontal oscillator power supply terminal, and
   a startup detector coupled to the voltage dropping circuit and also coupled to a derivative voltage source derived from a flyback winding so that during startup of the receiver the supply current for the horizontal oscillator is provided by the Horizontal B+ through the voltage dropping circuit and subsequent to the time at which the voltage developed by the derivative voltage source coupled to the startup detector exceeds a predetermined value, the oscillator supply current is provided by a derivative voltage source.

2. A power-saving improvement in a television receiver as described in claim 1 wherein the dropping circuit includes a series-connected transistor and resistance and wherein the steering network comprises at least two diodes having cathodes interconnected and having the anode of one connected to the dropping circuit and the anode of another coupled to a derivative voltage source.

3. A power-saving improvement as defined in either claim 1 or 2 wherein the startup detector comprises a transistor coupled to the dropping circuit and also coupled through a zener diode to a derivative voltage source.

4. In a receiver having a first voltage source for at least the horizontal deflection circuit, said source derived from the AC line and returned to a Hot ground, and a plurality of other voltage sources derived from flyback transformer secondary windings, a power-saving circuit for supplying a voltage to the horizontal oscillator, said circuit comprising:
 a semiconductor device coupled at a first electrode to an output of the first voltage source;
 a steering network having one input coupled to a second electrode of the semiconductor device, another input coupled to a voltage source derived from a flyback transformer secondary winding, and an output coupled to the power supply terminal of the horizontal oscillator; and
 a startup detector coupled to a third electrode of the semiconductor device and to a source of voltage derived from a flyback secondary winding so that during startup the semiconductor device is conducting and supplies current to the horizontal oscillator and during steady-state operation the semiconductor is cut off and the horizontal oscillator is supplied current from a voltage source derived from a flyback secondary winding.

5. A power-saving supply system for a horizontal oscillator comprising:
 a first voltage source for supplying power to at least the horizontal output stage;
 at least one derivative voltage source derived from a winding on the flyback transformer for supplying power to the horizontal oscillator;
 a voltage dropping circuit having a first electrode coupled to the first voltage source;
 a steering network having one input coupled to a second electrode of the voltage dropping circuit, another input coupled to a derivative voltage source and an output coupled to the horizontal oscillator power supply terminal;
 a startup detector having an input coupled to a derivative supply and an output coupled to a third electrode of the voltage dropping circuit, said detector responsive to the magnitude of the derivative supply coupled to its input so that during a first period of time the oscillator supply current is provided by the first voltage source and during a second period of time the oscillator supply current is provided by a derivative voltage source.

6. A supply system as defined in claim 5 wherein the voltage dropping circuit includes a semiconductor device having a first electrode coupled to the first voltage source and a second electrode coupled to an input of the steering network so that during the first period of time the supply current to the oscillator flows through the semiconductor device.

7. A supply system as defined in claim 6 wherein the output of the startup detector is coupled to a third electrode of the semiconductor device and said electrode is coupled through an impedance to the first voltage source so that during the first period of time the semiconductor device is rendered conductive and during the second period of time it is rendered nonconductive.

8. A supply system as defined in claim 7 wherein the semiconductor device is a first transistor having a collector coupled through a resistor to the first voltage source, an emitter coupled to an input of the steering network and a base coupled to the output of the steering network.

9. A supply system as defined in either claim 5 or claim 8 wherein the startup detector includes a second transistor having a first electrode coupled to a derivative supply, a second electrode coupled to the third electrode of the voltage dropping circuit, and a third electrode coupled to a reference potential.

10. A supply system as defined in claim 9 wherein the first electrode of the second transistor is coupled through a diode to a derivative supply so that said transistor is rendered conductive in response to a voltage developed by the derivative supply above a predetermined value so that during startup the oscillator supply current is provided by the first voltage source and is subsequently provided by a derivative voltage supply.

11. A supply system as defined in claim 9 wherein the first, second and third electrodes of the second transistor are, respectively, a base, collector and emitter.

12. A supply system as defined in claim 10 wherein the diode is a Zener diode.

* * * * *